(12) United States Patent  
O'Reirdan et al.

(10) Patent No.: US 8,463,938 B2  
(45) Date of Patent: Jun. 11, 2013

(54) ADDRESS COUPLET COMMUNICATION FILTERING

(75) Inventors: Michael John O'Reirdan, Palmyra, NJ (US); Michael Kemp, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 593 days.

(21) Appl. No.: 12/604,823

(22) Filed: Oct. 23, 2009

(65) Prior Publication Data

US 2011/0099291 A1    Apr. 28, 2011

(51) Int. Cl.
- *G06F 15/173* (2006.01)
- *G06F 15/16* (2006.01)
- *H04L 9/32* (2006.01)
- *G06F 7/04* (2006.01)

(52) U.S. Cl.
USPC ........... 709/238; 709/206; 713/168; 713/170; 726/5

(58) Field of Classification Search
USPC ................ 709/206, 238; 713/168, 170; 726/5
See application file for complete search history.

(56) References Cited

U.S. PATENT DOCUMENTS

| | | | | |
|---|---|---|---|---|
| 6,393,464 | B1* | 5/2002 | Dieterman | 709/206 |
| 8,024,803 | B1* | 9/2011 | Cooley et al. | 726/22 |
| 2004/0073617 | A1* | 4/2004 | Milliken et al. | 709/206 |
| 2005/0015449 | A1* | 1/2005 | Klos et al. | 709/206 |
| 2005/0071432 | A1* | 3/2005 | Royston | 709/206 |
| 2005/0076241 | A1* | 4/2005 | Appelman | 713/201 |
| 2006/0200531 | A1* | 9/2006 | Tokuda et al. | 709/206 |

* cited by examiner

*Primary Examiner* — Ranodhi Serrao
(74) *Attorney, Agent, or Firm* — Banner & Witcoff, Ltd.

(57) ABSTRACT

A method, apparatus, and system are disclosed that provide an approved address couplet listing for communication handling. An inbound communication including sender and recipient field entries may be compared as a pair or couplet against the listing to determine whether the inbound communication should be discarded, subjected to additional (spam related) processing, or forwarded for storage or delivery purposes. The comparison may take place in conjunction with one or more hashing functions.

16 Claims, 6 Drawing Sheets

ADDRESS COUPLET COMMUNICATION FILTERING

FIELD

Aspects described herein generally relate to computing technologies used to filter data. More specifically, an apparatus, method and system are described for aggregating contact information and verifying whether data should be delivered to one or more recipients based on one or more criteria.

BACKGROUND

Improvements in computing technologies have changed the way people accomplish various tasks. For example, the Internet, and more specifically electronic mail (email), allows users to exchange documents, pictures, files and the like relatively quickly. Blacklisting has been used to prevent unwanted messages, commonly referred to as "spam", from reaching a legitimate receiver. In fact, estimates suggest that well over ninety percent (90%) of all incoming traffic to a mail platform is spam. This spam needs to be discarded to ensure that a recipient's inbox is not bombarded with unsolicited, unwanted, and often fraudulent emails. A goal of a spam filter is to reduce the flow of unsolicited mail to the recipient's inbox. In this manner, a user (or organization, or any other entity) can specify one or more contacts that the user does not want to receive messages from, thereby blacklisting the one or more contacts. Estimates suggest that blacklists are effective in stopping seventy to eighty percent (70-80%) of spam.

Many spam filters block emails based on the sender's Internet Protocol (IP) address. Spammers can try to evade such filters by periodically changing their own IP address, but the available address space under the current IP scheme (Version 4, or IPv4) is limited, and spammers cannot always find a new address to use. However, the Internet Engineering Task Force (IETF) designated Internet Protocol, Version 6 (IPv6) as the successor to IPv4. Addresses in IPv6 are one-hundred twenty eight (128) bits, compared to the mere thirty-two (32) bits in IPv4. IPv6 space will be so vast that a spammer will have many more source addresses from which to send their spam, making filtering even more difficult than it is today. Accordingly, the blacklisting techniques that have been utilized in conjunction with IPv4 will be less in terms of filtering spam messages under IPv6.

Additionally, as the number of Internet users continues to increase, the burden placed on filtering and processing algorithms increases as well. Stated in a slightly different way, traditional inbound message processing techniques will be ineffective from a performance standpoint in the not too distant future.

BRIEF SUMMARY

The following presents a simplified summary of features in order to provide a basic understanding of some aspects of the systems and features described herein. This summary is not an extensive overview, and is not intended to identify key or critical elements or to delineate the scope of the claims. The following summary merely presents some concepts and aspects in a simplified form as a prelude to the more detailed description provided below.

Features herein are directed to an apparatus, method and system for providing address couplet message filtering and switching for communications. More specifically, filtering and processing techniques may be used to sort inbound messages based on one or more lists of approved address couplets maintained by or on behalf of users of a platform or network.

Inbound communications (e.g., emails, voice mails, text messages, etc.) may be checked for a combination of valid "from" and "to" addresses. In some embodiments, the check may be performed on the "from" and "to" fields as a couplet or pair. In some embodiments, the couplets or pairs associated with an inbound communication may be hashed to facilitate and improve storage and processing.

If a check is successful, an inbound communication may be routed to an end-user inbox, or more generally, a delivery or storage service, with minimal further checks. If the check is unsuccessful, additional filtering or processing techniques may be applied to the inbound message. In some embodiments, the additional filtering or processing may include spam filtering. In some embodiments, the additional filtering or processing may include rejecting or discarding of the message.

BRIEF DESCRIPTION OF THE DRAWINGS

A more complete understanding of the features herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which one or more features herein may be practiced. Other embodiments may be utilized and structural and functional modifications may be made without departing from the scope of the present invention.

One or more features herein provide for the ability to intelligently route communications based on logical rules and address couplets identifying entities (e.g., the sending and/or receiving devices, their corresponding addresses, phone numbers (SIP), etc.). Some embodiments described herein provide an ability to reduce processing burdens with respect to inbound communications (e.g., email) by discarding unwanted communications early in the process of inbound message handling, and accepting wanted communications early in the process of inbound message handling. Furthermore, features herein may provide a scaleable platform for accepting IPv6 and IPv4 based messages.

Figure 1:
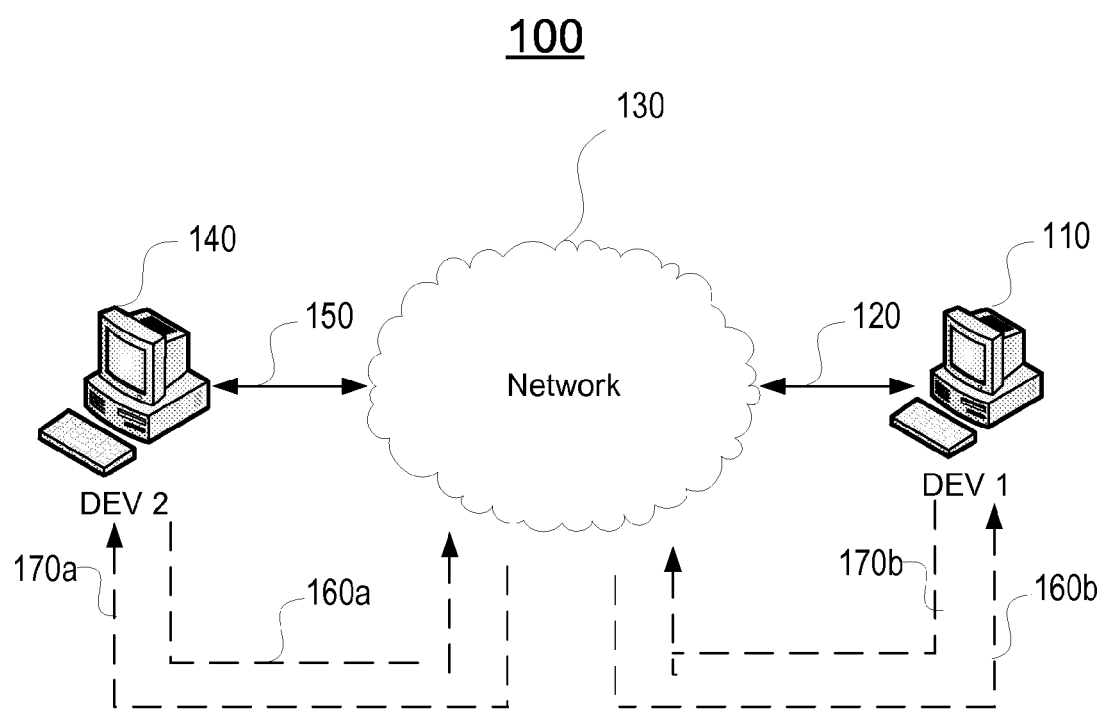
FIG. 1 illustrates a network computing environment suitable for carrying out one or more illustrative aspects described herein.

FIG. 1 illustrates a network computing environment 100 suitable for carrying out one or more features described herein. For example, FIG. 1 illustrates a first device DEV1 110 (e.g., a computing device, set-top box, a mobile device such as a cell phone or personal data assistant/PDA, etc.) connected to a network 130 via a connection 120. Network 130 may be any type of communication network, and may include the Internet, an intranet, wired or wireless networks, or any other mechanism suitable for facilitating communication between computing platforms in general. For example, network 130 may be a cable television distribution network, with cable modem and/or fiber connections. FIG. 1 also depicts a second device DEV2 140 (e.g., a server) connected to network 130 via a connection 150. By virtue of the connectivity as shown, DEV1 110 and DEV2 140 may communicate with one another. Such communications may enable the exchange of various types of information. For example, the communications may include data to be exchanged between DEV1 110 and DEV2 140. Such data may include images, video files, text documents, instant messages, emails, voicemails, and the like. The communications may further include additional information such as control information.

Connections 120 and 150 illustrate interconnections for communication purposes. The actual connections represented by connections 120 and 150 may be embodied in various forms. For example, connections 120 and 150 may be hardwired/wireline connections, such as a coaxial cable, telephone line, fiber optic line, etc. Alternatively, connections 120 and 150 may be wireless connections, such as a local wireless network connection, cellular telephone connection, etc. Connections 120 and 150 are shown in FIG. 1 as supporting bi-directional communications (via the dual arrow heads on each of connections 120 and 150). Alternatively, or additionally, computing environment 100 may be structured to support separate forward (160a and 160b) and reverse (170a and 170b) channel connections to facilitate the communication.

Computing environment 100 may be carried out as part of a larger network consisting of more than two devices. For example, DEV2 140 may exchange communications with a plurality of other devices (not shown) in addition to DEV1 110. The communications may be conducted using one or more communication protocols. Furthermore, computing environment 100 may include one or more intermediary nodes (not shown) that may buffer, store, or route communications between the various devices.

Figure 2:
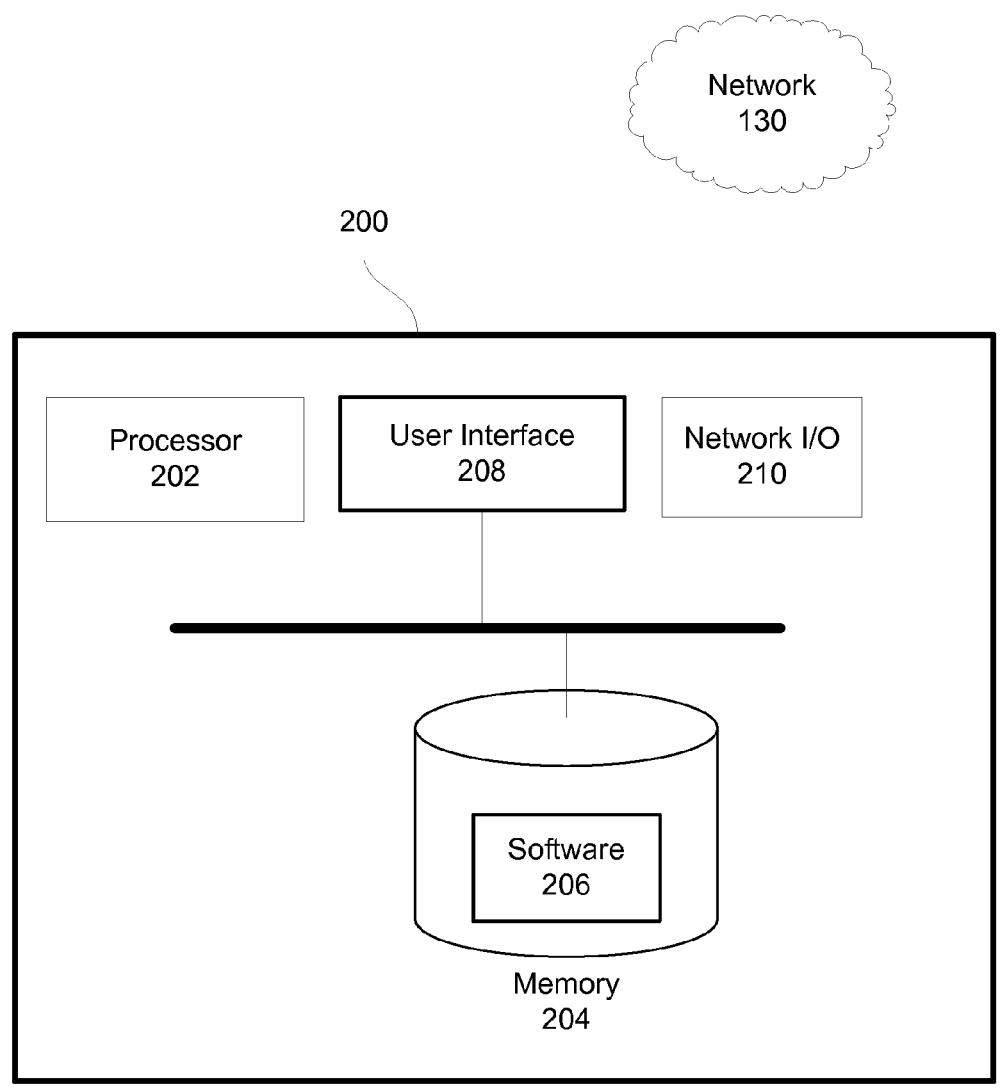
FIG. 2 illustrates a data processing architecture suitable for carrying out one or more illustrative aspects described herein.

FIG. 2 illustrates a simplified, generic computing device 200 that can be used to implement the various features described herein. The device itself may be any type of computing device, such as a set-top box, a desktop computer, laptop computer, notebook computer, network server, portable computing device, personal digital assistant, smart phone, mobile telephone, cellular telephone (cell phone), IP (Internet Protocol) telephone, terminal, distributed computing network device, mobile media device, or any other device having the requisite components or abilities to operate as described herein. As shown in FIG. 2, device 200 may include one or more processors 202 (e.g., a microprocessor) configured to execute instructions to cause the device to perform various functions. The instructions may be in the form of executable software code stored in memory 204 (software shown as element 206). The memory 204 may be in any desired form, such as hard disk, floppy disk, optical disk, FLASH memory, etc.

The device 200 may include one or more user interface components 208. The user interface components may include various mechanisms to allow interaction with a user. For example, the interface 208 may include buttons, keypads, joysticks, roller balls, mice, touch sensitive screen, microphones, etc. that a user can use to provide input to the device. The interface 208 may also include one or more components to provide feedback to the user, such as a display screen, light-emitting diodes, speaker, vibration circuit, etc.

The device 200 may also include one or more network interfaces 210 to allow the device to communicate with one or more external networks, such as network 130. The interface(s) may take any desired form, depending on the network. So, for example, interface 210 may include a cable modem to allow the device 200 to communicate with a cable television network's coaxial or hybrid fiber/coaxial network. The interface 210 may include a digital subscriber loop (DSL) modem to connect to a local telephone company's network of twisted pair telephone wires. Other networks, such as cellular, satellite, WiMax, etc. may also be connected through a network interface 210.

Furthermore, the computing device 200 may include additional hardware, software and/or firmware to support one or more features as described herein. For example, computing device 200 may include a camera (not shown) and/or audio-visual (e.g., movie/film) support hardware/software/firmware. Device 200 may be configured to receive, decode and process an incoming signal from the various networks to which the device is communicatively connected.

Device 200 shown in FIG. 2 is merely illustrative. Additional or alternative components may be used in some embodiments. For example, the components used in a particular implementation may be dependent on the communication standards or equipment supported by a component of device 200, or by an external component such as one on the network 130. Additionally, the various lines, interconnections and boxes are shown for ease of explanation, and other configurations may be used as desired (e.g., dividing a component into multiple components, combining them, inserting additional elements between them, alternate wiring, etc.).

Aspects described herein provide a user (or any other person, such as a network administrator) the ability to define one or more sender/recipient pairs, or couplets, identifying types of inbound communications or messages that will be given priority or permitted delivery. The couplets may be embodied as part of a white route store, or "wStore" list that stores external authorized contact information or other identification information (e.g., addresses). In some embodiments, the wStore is not visible to (e.g., is hidden from) an internal user base, but the information included in the wStore is used to determine how incoming communications should be handled (e.g., directly delivered to a recipient's inbox, phone, instant messaging account, etc.; rejected/refused, or subjected to further processing to decide whether to deliver the message).

Data identifying recipients and senders may be stored in a memory (e.g., memory 204) as sender/recipient couplets or pairs, using the following format as an example:
    <Recipient email address|Sender email address>
    or
    <Recipient1@Recipient_Domain.com|Sender1@Sender_Domain1.com>

In the last example, the couplet indicates that the user at Recipient1@Recipient_Domain.com wishes to receive incoming messages from the user at Sender1@Sender_Domain1.

The listing of valid couplets may make use of wildcard or control characters to simplify the listing and provide additional logical treatment. For example, listing just the domain portion of an address may be interpreted to refer to all individuals at a particular domain. So the following couplet:
    <Recipient1@Recipient 1_Domain.com|@Sender_Domain.com> may be used to indicate that inbound messages from any sender at the "Sender_Domain1.com" domain will be permitted entry. Similarly, the following entry may be used to indicate that messages from "Sender1@Sender_Domain1.com"

and addressed to anyone at the "Recipient_Domain.com" domain are to be permitted entry:

<@Recipient_Domain.com|Sender1@Sender_Domain1.com>

In those examples, the "@" symbol may be treated as a wildcard when appearing at the beginning of one of the addresses in a couplet.

Other wildcards may be used as well. For example, a keyword "ALL" may be used to designate all domains, such that the following couplet would permit entry of all emails directed to Recipient1@Recipient_Domain.com:

<Recipient1@Recipient_Domain.com|@ALL>

Similarly, a listing allowing a particular sender to send to all recipients at all domains may be as follows:

<@ALL|Sender1@Sender_Domain1.com>

Individual user IDs may be used with the "ALL" wildcard as well. For example, to allow a recipient to receive all emails from a particular username, regardless of which account the sending user is using, the listing may be as follows:

<Recipient1@Recipient_Domain.com|Sender1@ALL>

The discussion above has used, as an example, lists of approved couplets for messages that are to be admitted entry to the recipient's inbox. However, couplets can also be used to identify messages that should be denied entry. For example, the wStore may include such negative listings in a separate section, or with a "negative" character. For example, the exclamation point "!" can be used as a negative character, and the following couplet can be used to indicate that Recipient1@Recipient_Domain1.com should not receive any messages from Sender1@Sender_Domain1.com:

<Recipient1@Recipient_Domain.com|!Sender1@Sender_Domain1.com>

Similarly, wildcards can be used with such negative characters to block multiple messages at a time. For example, the following couplet can be used to block all incoming messages directed to Recipient1@Recipient_Domain.com and being sent by anyone at Sender_Domain1.com:

<Recipient1@Recipient_Domain.com|!@Sender_Domain1.com>

The "ALL" wildcard can also be used with a negative character to block all messages from all domains if a user no longer wants to receive any more emails at all. Such a couplet may be as follows:

<Recipient1@Recipient_Domain.com|!@ALL>

In addition to the wildcards noted above, additional control characters, or extensions, may be added to a couplet to indicate other treatment. Extensions may, for example, be added to the end of a couplet, as in the one below:

<Recipient1@Recipient_Domain.com|Sender1@Sender_Domain1.com|Extension1>

The additional treatment signified by the extension may be applied to an incoming message that matches the couplet's recipient/sender pair of addresses. Many kinds of extension treatment are possible. For example, one type of extension may be a parental control. A parental control extension (e.g., a keyword "PB") may indicate that an incoming message matching this couplet should be subjected to parental control treatment before delivery to the recipient's inbox. Such additional treatment may mean, for example, forwarding to a parent's inbox for approval before forwarding on to the recipient's inbox.

Another type of extension treatment may be based on time of day. For example, a time extension (e.g., "20:00-10:00") may be added to indicate that an incoming message matching the couplet should only be delivered (or blocked, depending on the couplet) in the indicate times. Time values can also be combined with other extensions, such that the time of day restriction is applied to the extension, as opposed to the entire message. So for example, an extension of "PB20:00-10:00" might mean that the parental control treatment is only applied between 20:00 at night and 10:00 the next morning.

Another type of extension may specify an alternate device or account to which the incoming message should be forwarded. For example, an extension of "SMS" may indicate that the incoming message should be forwarded as a text message to an SMS device (or account) of the couplet's recipient. An extension of "VMAIL" may indicate that the message should be forwarded to the recipient's voice mail server (e.g., phone number or Voice Over IP server); "CELL" may refer to a cell phone, etc. To support this feature, the wStore may store additional information identifying one or more devices and/or accounts for the various recipients. This additional information may have the following form, in which the recipient identifier is followed by pairs matching an extension code with an address/phone number of the alternative device:

<Recipient1@Recipient_Domain.com
        SMS:99-9999
        CELL: (301) 999-9999
        VMAIL: (301) 999-9998
        VMAIL2: Recipient1@voicemailserver.com The time of day extension may be combined with the alternate device extension to define how incoming messages should be routed at different times of day. For example, the following couplet may indicate that messages from noon to five are to be forwarded to the recipient's SMS account, while messages from 9 am to noon are to be forwarded to a voice-mail account:

<Recipient1@Domain.com|Sender1@Domain1.com|SMS12:00-17:00|VMAIL9:00-12:00>

Another extension may be used to grant modification privileges, allowing modification of the couplet. For example, a "TRUST" extension may indicate that the identified sender is permitted to modify the sender's address as it appears in the couplet. This may be useful, for example, if the user wishes to permit incoming messages from a business they trust (e.g., their bank), but the user does not want to be bothered with updating the couplet if the bank were to change its own email address, or if the bank wished to send its emails to the user from another account. So for example, the following couplet may allow incoming messages from "Alert@Bank.com", and may grant the business having the "Alert@Bank.com" address the right to edit the couplet in the future:

<Recipient1@Recipient_Domain.com|Alert@Bank.com|TRUST>

If, in the future, the bank were to change its domain name from "Bank.com" to "NewBank.com," it could have the right to edit this couplet without feedback or involvement from the user, to make the new couplet read as follows:

<Recipient1@Recipient_Domain.com|Alert@NewBank.com|TRUST>

To change the couplet, the bank may need to verify its identity to the processor 202 in control of the wStore being edited. This verification may be accomplished in a variety of ways. For example, the original Bank might register itself with the processor 202 in advance, providing the processor 202 with a password that the Bank will use when requesting to edit a couplet. Alternatively, a trusted party certificate may be generated for the Bank by a certificate authority, and the Bank may provide the certificate to the processor 202, along with a version signed using a private key of the Bank (which can be verified by the processor 202 using the Bank's public key, which may be available from a public source such as a certificate authority on the Internet).

The above examples of extensions are simply examples. Other additional processing may be supported via extensions to implement any desired criteria that may affect the determination of whether to accept an incoming message (e.g., mailbox size, frequency of messages, etc.).

Figure 3:
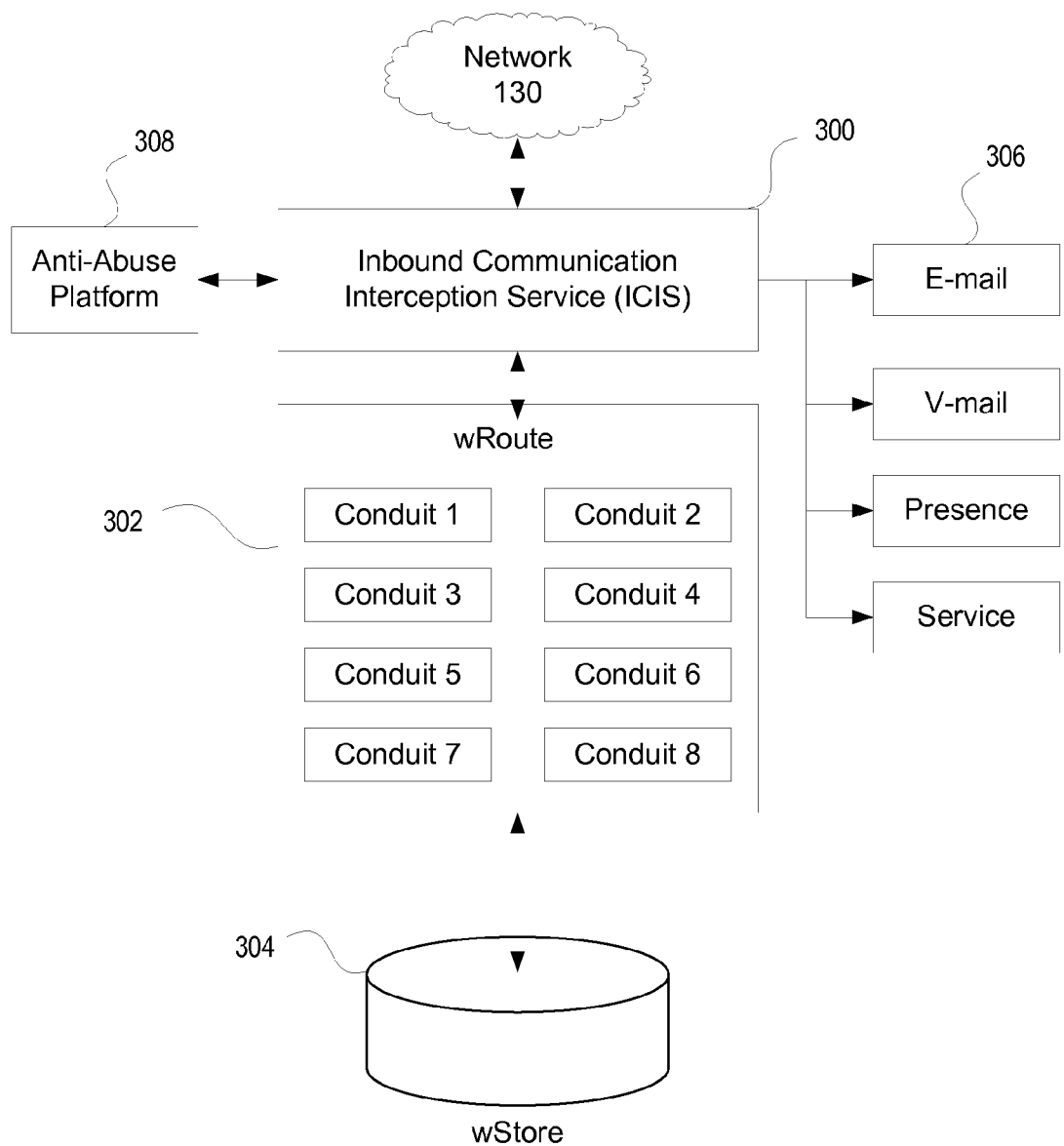
FIG. 3 illustrates an example arrangement of logical entities useable for carrying out various features described herein.

FIG. 3 illustrates a relationship of logical entities that may each be implemented as devices, such as device 200, to handle incoming messages using the wStore system described above. The system may include an inbound communication interception service (ICIS—300). The ICIS may be a messaging server configured to initially receive various types of incoming messages from an external network 130 (e.g., Internet, phone call, text message, etc.). The ICIS 300 may use (or incorporate) a wRoute service 302. The wRoute service 302 may receive incoming message information from the ICIS, and may make a determination as to whether the incoming message should be forwarded to the intended destination, or if the message should be re-routed somewhere else for further processing.

To make the determination, the wRoute service may access the wStore 304 data discussed above and compare the incoming message information with the various couplets in the wStore to determine which couplets, if any, apply to the incoming message, and what the resulting handling should be. The wRoute service 302 may employ a number of conduit services, which can be additional software processes and/or routines to implement the various different types of processing that can be required based on couplets and extensions (e.g., a conduit process can be used to perform the time calculation, or identify parental control, etc.). From that, the wRoute service 302 can reply to the ICIS 300 with an indication of the further processing, and the ICIS can then route the message to the recipient's corresponding inbox 306 for the message type, or to an anti-abuse platform 308 for further analysis as a possible abusive message.

Figure 4A:
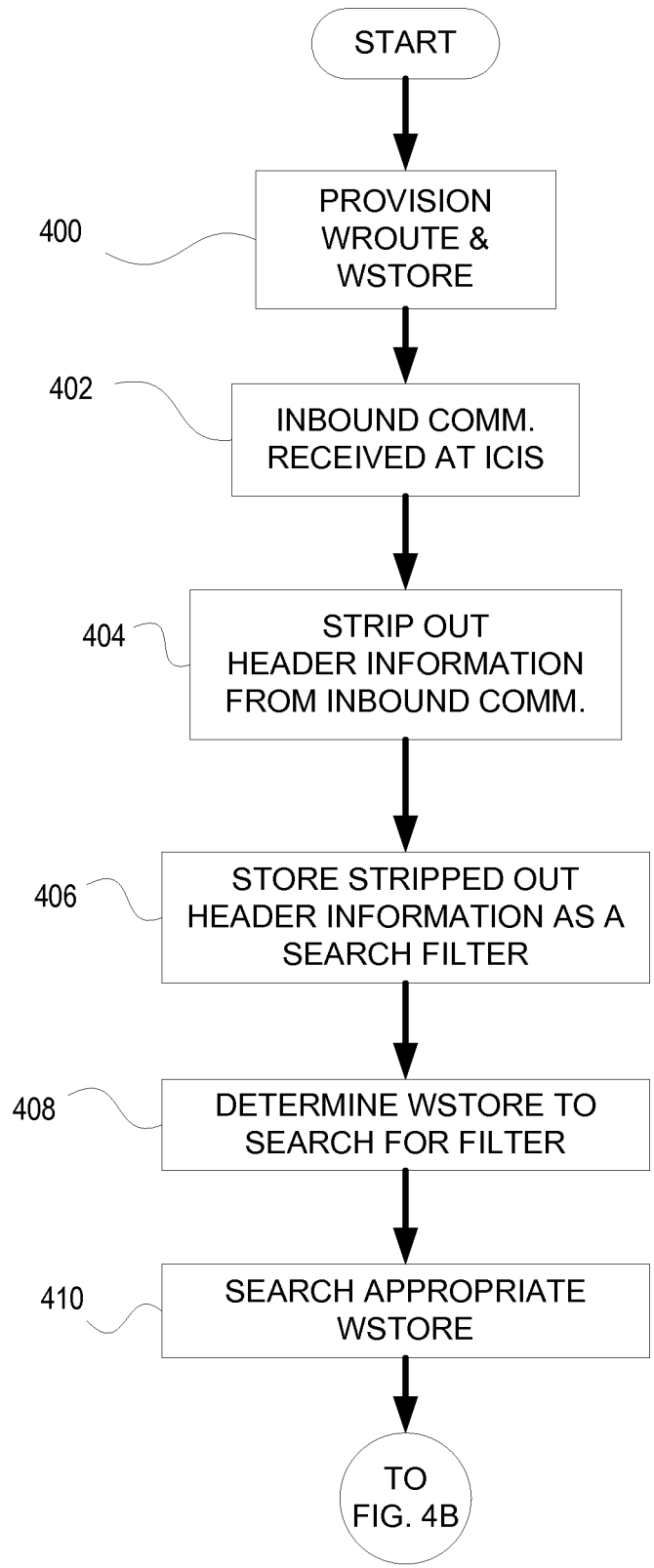
FIGS. 4A-4B illustrate an example process of handling incoming messages.
Figure 4B:
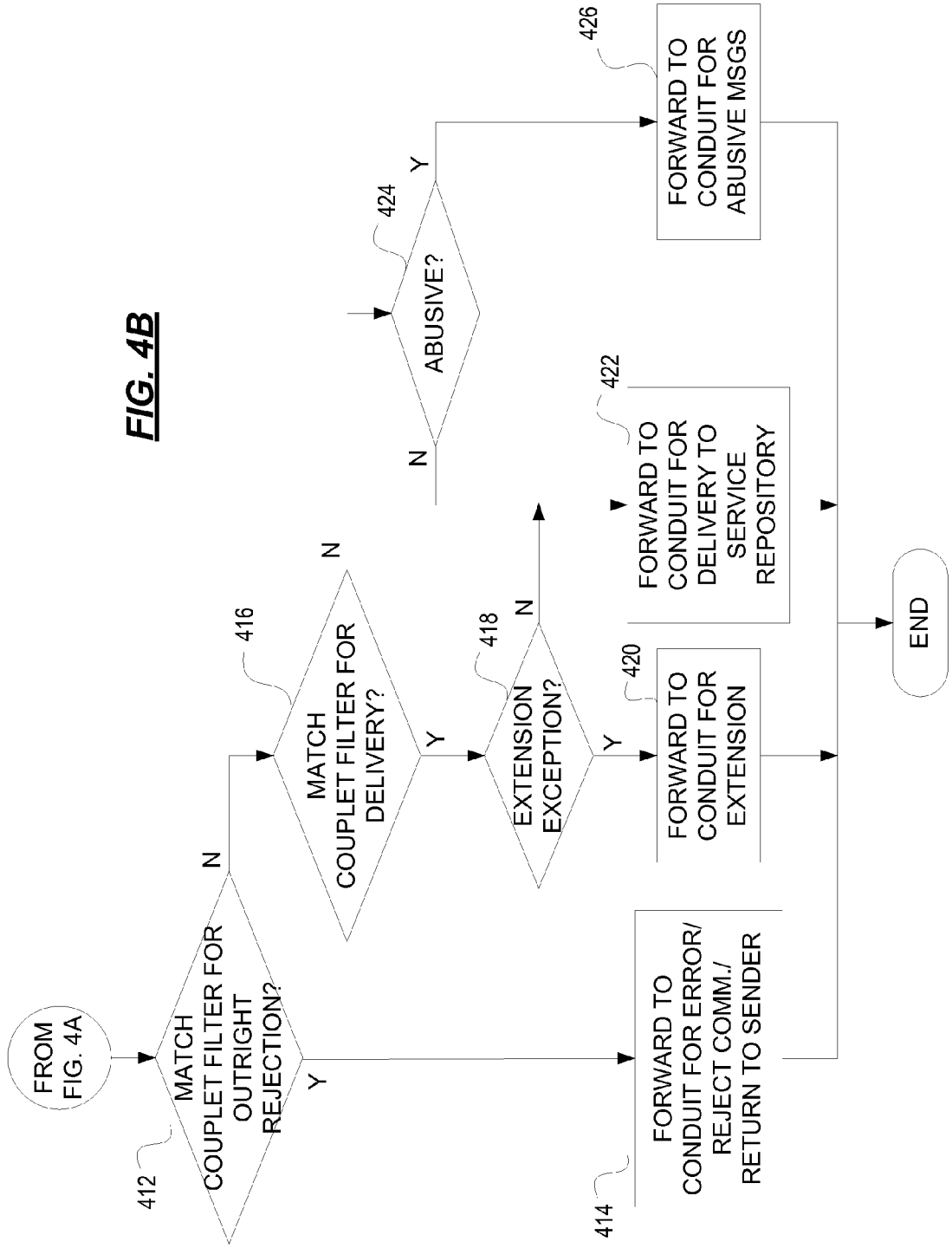

FIGS. 4a and 4b illustrate an example of this operation in more detail. The illustrated steps may be performed by the wRoute service 302 and/or the ICIS 300, and those services may be implemented using one or more computing devices 200.

The first step 400 is to provision the wRoute service 302 and the wStore 304, initializing them for operation. The provisioning of the wRoute service 302 generally provides the service with the software routines that are to be used when evaluating incoming messages. For example, any extensions that are to be supported by the system (e.g., a time of day check, or a parental monitor check) may ultimately be carried out by the wRoute service 302, so the necessary software routines need to be loaded and/or activated. Provisioning the wStore 304 may involve storing the various couplets that will define the types of incoming messages that are to be permitted and/or excluded from delivery into a user's inbox or service repository.

The provisioning may occur in a variety of ways. First of all, provisioning may simply occur when the wRoute service 302 is initially installed. For example, a new server computing device may be loaded with the software needed to handle the then-known extensions and routing options for incoming messages. The service may automatically scan the address books (e.g., a third party universal address book, such as in PLAXO) of the various users having accounts on the system, creating couplets to allow incoming messages from a contact to the user whose address book is being scanned, and storing the couplets in the wStore 304. Additionally, users may have the option of editing their own entries for the wStore 304. For example, the user can view their own address book, which may give the user a selectable option to "allow" or "disallow" incoming messages from a contact. The user may also determine the extension criteria, such as time of day, parental control, incoming message device type, message forwarding, etc. by choosing corresponding options from the address book, or from a web-based application to which the user can be redirected.

Users can also edit the wStore 304 through other means. For example, the wStore may offer an Internet portal through which the user can view and edit wStore entries. The Internet portal may display a web page giving the user options to choose, such as the extensions to apply and the contacts to which they should apply. As another alternative, the user may be given an option to add or edit an entry upon viewing a successfully received incoming message. For example, when an incoming email successfully passes through the ICIS and wRoute, and is delivered to the user's inbox, the email may be displayed for the user with options such as "Edit Delivery Settings," "Grant Future Emails from This Person," "Reject Future Emails from this Person," "Forward Emails from this Person to . . . ," etc. along with options to add extensions (e.g., "Time Restrictions" or "Add Parental Monitoring").

The wStore 304 entries may be edited by other individuals as well. For example, certain third parties may be granted access to make certain edits to the entries. The "trusted" entity extension discussed above allows the trusted third party to edit their information in certain entries. System administrators of the wStore 304 may also directly access and edit the wStore entries. These third parties may make their edits using a third party Internet portal and web page, directly through an administrator interface, or through other desired methods.

As noted above, the provisioning of the wStore and wRoute services is illustrated at the beginning of the FIG. 4a method, but in implementation the provisioning may occur dynamically and continuously. Once they are provisioned, the process proceeds to step 402, in which the ICIS 300 receives an inbound message. The inbound message may be of any type, such as voice, voice over IP (VoIP), e-mail, SMS, text message, etc., and the ICIS 300 may include all necessary interfaces for receiving the different types of messages it supports. When an incoming message is received, the wRoute service may be invoked to strip out, in step 404, the header information that identifies the sender and recipient of the message.

Then, in step 406, the sender and recipient information may be used to generate a search filter. The search filter may be a data value resembling the <recipient|sender> format discussed above with respect to the wStore 304 entries.

If there are multiple wStore services in use (this possibility is addressed further below in FIG. 5), the wRoute service may determine which wStore service to use in step 408. This determination may depend on whichever methodology is used to implement the multiple wStores. For example, in some embodiments the wStore may simply be duplicated across multiple servers, to improve access speed, to improve performance, availability and scalability. In such embodiments, the step 408 determination might simply be based on the availability of the various duplicate wStore servers—the one with the most availability may be selected. In other embodiments, the wStore entries may be divided among multiple wStore servers. For example, twenty-six (26) wStore servers may be implemented, where each server stores entries that begin with one letter of the English alphabet. As another example, the servers may each handle different domains (e.g., one server might store the wStore entries for all users at "Recipient_Domain1.com"). As another example, and as will be discussed further below, the various entries and search filters may be hashed using any desired hashing algorithm to result in a smaller version of the entries and filter. The hashed versions may speed up the process of searching the wStore for a match. If such a hashing approach is used, then the various wStore servers may each contain a subset of the hashed entries (e.g., if a hash is used such that the hashed value is a decimal numeric value, then ten wStore servers may be used, each storing entries having hash values that begin with a numeric digit from 0-9). The particular treatment of the data can be customized according to the type of communication or message being handled. For example, a voice message may tend to have long periods of silence, and the desired hashing or treatment of the data may be chosen to account for this pattern in the data. Similarly, patterns in other communication types (e.g., emails, instant messages, etc.) may also be used to choose the type of data handling. Additionally, portions of the entries may remain unhashed. For example, wildcard values may be excluded from the hash.

When the appropriate wStore is identified in step 408, the wRoute server may then use the search filter to search through the appropriate wStore in step 410 to determine if there is a matching entry. In a simple sense, a matching entry may have a recipient/sender pair (or couplet) that matches the recipient/sender pair of the search filter. If a hashing algorithm is used to speed up the search, then an initial match may be based on whether the hashed values match. If there is a match among hashed values, then the wRoute server may access the pre-hashed values of both the search filter and the entry having the matching hash value, to determine whether there is an actual match of couplets (depending on the hashing algorithm, it is possible for two different original values to result in the same hashed value).

In step 412, if a matching entry is found, the wRoute server may check to determine whether the matching entry was one of outright rejection. As noted above, a user may use certain control characters and wildcards to refuse receipt of certain messages and/or recipients. If the matching entry indicates that the inbound message is to be refused, then the process may move to step 414, and the message may be passed from the ICIS 300 to a conduit process that handles such message rejections. The rejection conduit may send an automatic reply to the sender, using the ICIS 300 if desired, informing the sender that there was an error in message delivery, or that the message was refused by the recipient, or otherwise could not be delivered. That response may then end the process for the current message (and the process may return to step 402 to receive the next message, or to step 400 to re-provision the wStore or wRoute service).

If, in step 412, there was no matching entry that outright rejected the message, the wRoute service may check, in step 416, whether there was a matching wStore entry that permitted messages having the couplet in the search filter. If such a match was found, then the process may proceed to step 418 to consider any extensions that may otherwise alter the deliverability of the current message. Although step 418 is illustrated as a single step, the details of this step may involve multiple iterations and sub-processes if multiple extensions are in the entry. For example, one extension process (or conduit) may be responsible for determining whether a time of day extension requires that the current message be re-routed. This processing may involve, for example, comparing the local time with the time values in the extension entry. Another example may include a parental monitoring conduit, which may check to determine whether the particular message requires a parent's approval. Additional extensions and extension conduit processes may be implemented as desired.

If the step 418 extension conduit(s) determine(s) that an extension applies to the current message, then the message may be forwarded to a conduit process for handling the extension exception in step 420. For example, if a time-of-day extension renders an otherwise deliverable email into one that should be handled differently (e.g., forwarded to another address), then the extension conduit process can handle the message accordingly.

If the step 418 there are no extensions that would alter the delivery of the message, then in step 422, the wRoute service (via the ICIS 300) may forward the message to the appropriate conduit for delivery of the message to its corresponding service repository. The service repository may be any service or server (e.g., a computing device) that handles the message type. So there may be a service repository that handles emails, another that handles voice messages, a presence host that attempts to locate the user through a call forwarding "find me" feature, etc., and the inbound message may be delivered to the inbox of the target user on the appropriate service repository.

If, in step 416, there has been no match between the search filter and the wStore entries, then the process may proceed to step 424. At this point, since no match has been found for the message, the message may be treated as any ordinary inbound message. In step 424, such ordinary messages may be subjected to a default level of abuse detection by an anti-abuse service platform. Such abuse detection may be performed by another conduit service, and may check for characteristics of an abusive message. Such characteristics may be certain keywords in the message body, large number of recipients exceeding a predetermined limit, a non-existent or blocked sender field, etc. If the anti-abuse service decides, in step 424, that the message does not contain abusive characteristics, then the process may proceed to step 422, in which the message may be forwarded to the appropriate conduit process for delivery to the corresponding service repository.

If abusive characteristics were found in step 424, then the process may proceed to step 426, and the message may be forwarded to a conduit process that handles abusive messages. Such a process may record information regarding the abusive message (e.g., creating a new denial wStore entry to outright deny acceptance of future messages having this sender), send a "message undelivered" response to the sender, etc. The conduit processes may further be extended to modify the treatment, to offer new features, communication methods, and device support.

Figure 5:
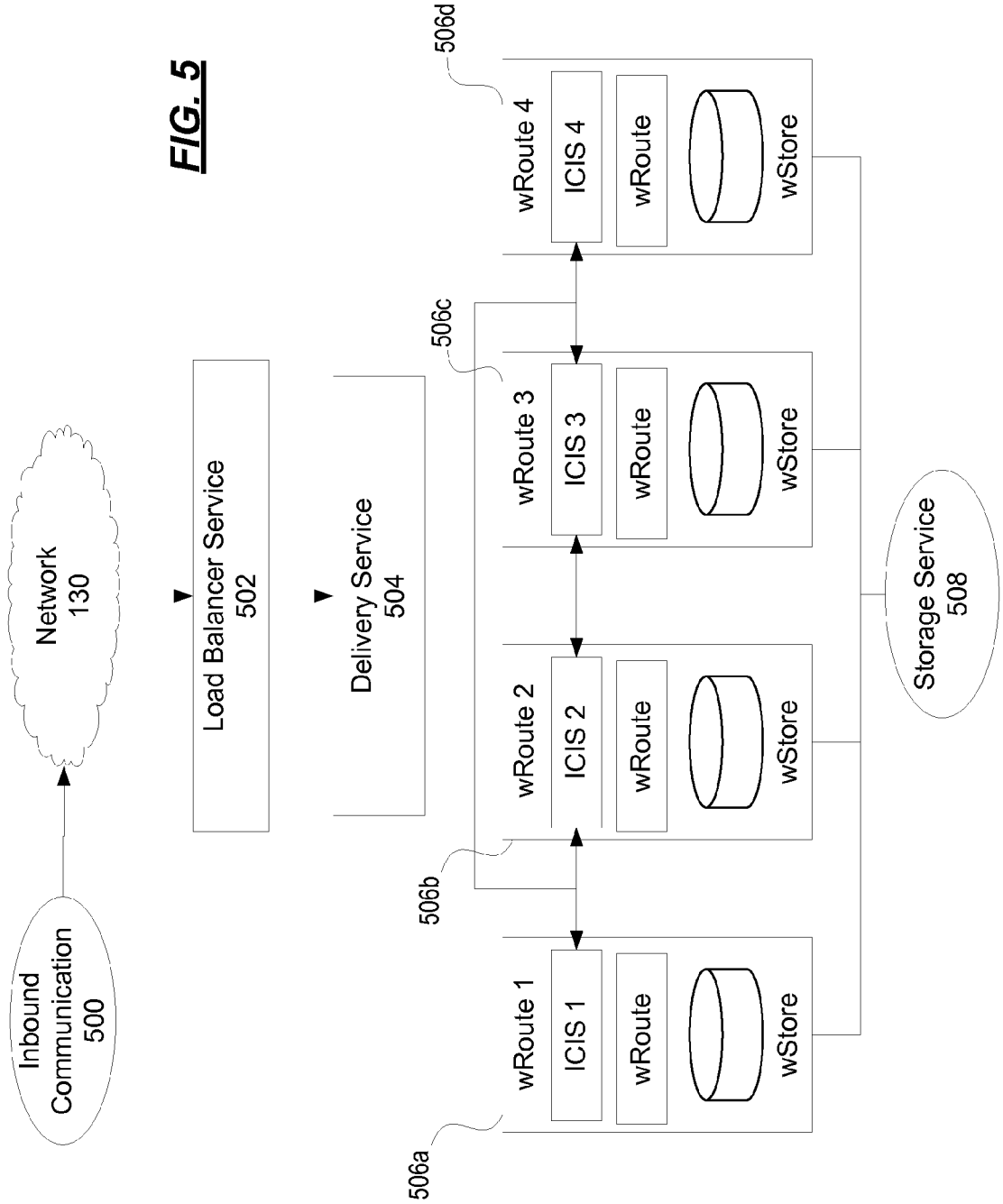
FIG. 5 illustrates an example arrangement of multiple routing services that may be used with the features described herein.

FIG. 5 illustrates an example modified system for handling incoming messages. In the FIG. 5 example, an incoming message 500 may still arrive via network 130 (e.g., email, voice over IP call, etc.), but rather than being directly routed to an ICIS 300, the FIG. 5 example includes a load balancer server running a load balancing service 502. The load balancing service 502 may be configured to distribute routing determinations among a plurality of wRoute services 506a-d, using a delivery service 504 to forward messages for wRoute handling at the appropriate time.

In periods of high activity and high messaging volume, the balancing service 502 may prioritize certain message types for delivery, and may buffer (e.g., temporarily store in a memory) lower priority messages for later handling. For example, voice calls and SMS text messages may be treated with higher priority because of the real-time dynamic nature of those communications, while emails may be treated with lower priority because a delay is more acceptable for an email.

To further alleviate processing burdens, multiple wRoute services 506a-d may share responsibilities for processing messages to determine how the messages should be delivered. Each service 506a-d may be identical, and may have the same structure as that described above for service 302. The division of labor among these wRoute services may be accomplished in a variety of ways. For example, each wRoute server may be allocated a predefined list of domains, with each wRoute server being responsible for processing messages that are addressed to someone in its list of domains. The load balancer service 502 may store copies of these predefined lists, and may use them to determine which wRoute server should be requested to process an incoming message. Alternatively, different users may be assigned to different wRoute services based on, for example, their email address (e.g., different wRoute servers handling addresses that begin with different letters of the alphabet, or numeric hash results that begin with the same number), their time of creation in the system (e.g., each server may handle a predetermined maximum number of addresses), geography or location (e.g., different wRoute servers used to handle messages for different geographic regions or address ranges), or other criteria. Processing may alternatively be assigned dynamically to wRoute servers based on load. Each server may store a queue of the incoming messages it needs to process, and the load balancer 502 may simply route a new incoming message to the server having the shortest queue.

Each wRoute server 506a-d may have its own wStore, as discussed above, but those wStore databases may all receive their data from a common storage service 508. The common storage service 508 may support consistency among the various wRoute services. Additionally, depending on the particular division of labor among the wRoute servers 506a-d, each server's wStore may be populated with only data that corresponds to the messages and/or inboxes that the particular wRoute is assigned to handle. So, for example, if wRoute 1 is assigned all of the inboxes in the "Recipient_Domain1.com" domain, then its wStore only needs to store the couplets that involve that domain. In some embodiments, and depending on the division of labor, a wRoute service that fails to find a match may forward its message to another wRoute service for processing, either as a double-check on the primary's search, or for some other reason (e.g., if the second service handles a range of couplets that may match the incoming message).

The components/entities shown in the figures may be embodied as hardware, software (e.g., instructions and/or a computer program product), firmware, or any combination thereof. Furthermore, the components/entities may be configured to perform, and may execute, one or more of the methods or features described herein.

Although the foregoing description was largely based on (email) messages, aspects of the disclosure may readily be adapted to accommodate other computer languages and/or protocols, such as Simple Object Access Protocol/Extensible Markup Language (SOAP/XML), Voice XML (VXML), Session Initiation Protocol (SIP) and the like. Any desired type of communication may be handled using some or all of the features described herein.

In terms of listing or otherwise making available the couplets for purposes of comparison with an inbound message, any number of techniques may be used. In some embodiments, a user may elect to publish her username and her contacts via a menu interface on a personal computer or Internet page, a push button interface on a communication device such as a telephone, or the like. For example, a user may register for the associated listing service, and may select one or more contacts to be included. The one or more contacts may be taken from an address book associated with the user (e.g., an address book associated with an email program, a universal contacts list such as from PLAXO, etc.), and a couplets can be generated from those contacts. As yet another publication technique, upon receiving an inbound communication from an unknown sender, a message may be displayed to the user (e.g., the user may select a soft button or the like to add the sender to a listing of approved contacts). In some embodiments, an organization or business may automatically publish a user and the user's contacts to an authorized listing, thereby alleviating the user of a need to engage in such an affirmative publication (e.g., passive publication techniques may be used).

Controls may be used to restrict a user's ability to add a couplet. For example, parental controls may be used such that a child's attempt to add a contact for a couplet may first have to be approved by the child's parent. As such, when a person first registers for service, the person may need to provide proof of age. As part of the service registration process, the person registering for service may specify one or more accounts (identified by user IDs) that correspond to children. Thus, when a child logs-in using his/her user ID, the service knows that a child is logged on. If the child requests to add a couplet, the service may route the child's request to the child's parent's account (identified by a separate user ID) and may require approval from the parent prior to adding the couplet for the child.

An organization/business entity may also restrict an ability to add a couplet based on a user's/employee's role in the organization. For example, in some embodiments the head of an organization may be provided an ability to add a couplet at any time, whereas a lower-tiered member of the organization may be restricted from adding couplets based on one or more criteria. For example, in some embodiments each lower-tiered member of the organization may be limited to having a maximum of N contacts, where N is an integer. In some embodiments, techniques similar to those described above with respect to children and parents may be used, with an administrator taking on the role of a parent with respect to a particular employee's request to add a couplet.

Device or protocol controls/filters may also be used with respect to messages. For example, a user might not want to receive messages that consume a large amount of bandwidth, such as large video files, from a contact when the user is out and using her mobile device. That same user might be willing to receive such high-bandwidth messages when she is at home and has her personal computer (PC) available, or has a steady supply of power available to power her mobile device. Accordingly, additional message handling features may be used to selectively route messages to a user based on a contextual environment associated with the user. For example, a user may be able to set a status (e.g., in conjunction with a user profile maintained on a website) indicating whether the user desires to receive particular types of messages. Thus, a user may set a status to receive text messages, but not messages that include video files. In some embodiments, the user's status may be of a more general nature, such as "out and about", and the service may determine which types of messages to forward based on the general status setting. Delivery service 504 may be used to selectively deliver or store messages based on the user's status.

The management of users and their associated couplets may be handled by the ICISs after publication in order to streamline the process. For example, a number of couplets may have information of the form: contact_X@service_provider1.com, where "contact_X" is intended to serve as a generic identifier for a number (X) of different people/contacts associated with a service provider service_provider1.com. If those X contacts are subsequently serviced by a different service provider (e.g., service_provider2.com), this change may be made at an organization level (e.g., at the level of the provider's contact stores) in order to alleviate each user from the burden of having to change or update their information. Maintaining the couplet information at the level of the contact stores (or more generally, at a higher level than the user level) may help to eliminate or mitigate discrepancies that would otherwise exist if each user was required to update or republish their own couplets.

Business entities and organizations (or more generally, networks) may incorporate one or more of the features described herein in order to streamline message handling processes. For example, a successful comparison of the couplets associated with an inbound message at a front-end of message handling architecture may serve to preserve (spam) processing resources for purposes of validating messages from a questionable sender. Such a preservation of resources may be of value in IPv6 based networks, given the increase in terms of the number of spam/unsolicited messages that is expected. The features described herein may be applied to any network at any level of abstraction or organization (e.g., an intranet, a personal/home network, etc.). Although the subject matter has been described in language specific to structural features and/or methodological acts, the subject matter defined in the appended claims is not necessarily limited to the specific features or acts described above. Rather, the specific features and acts described above are disclosed as example forms of implementing the claims, and changes may be made as desired. For example, components and/or steps may be combined, divided, rearranged, or omitted to suit particular desired embodiments. Additional components and/or steps may also be inserted as desired.

What is claimed is:

1. A method comprising:
   receiving, at a computing device, an inbound communication, the inbound communication comprising information identifying a sender of the inbound communication and an intended recipient of the inbound communication;
   generating an inbound communication sender and recipient identifier using information from the received inbound communication;
   matching the inbound communication sender and recipient identifier to a predefined identifier from a predefined list of sender and recipient identifiers, wherein the predefined list of sender and recipient identifiers comprises identifiers having wildcard designators for user names or domain names; and
   routing the inbound communication based on a command associated with the predefined identifier from the predefined list, wherein the command indicates at least one routing criterion that depends on a time of day,
   wherein one of the identifiers in the predefined list of sender and recipient identifiers comprises an indication of a trusted third party, and wherein the method further comprises granting the trusted third party access privileges to edit the one of the identifiers in the predefined list.

2. The method of claim 1, further comprising forwarding the inbound communication to an extension conduit service in response to determining that the predefined identifier comprises the command.

3. The method of claim 2, further comprising the extension conduit service determining how the inbound communication should be routed based on a routing criterion different from the inbound communication sender and recipient identifier.

4. The method of claim 1, wherein the command indicates that the inbound communication be forwarded to another recipient instead of the intended recipient identified in the inbound communication.

5. The method of claim 1, wherein the command identifies one or more receiving devices for receiving the inbound communication.

6. The method of claim 1, wherein the predefined identifier contains a plurality of control extensions, and the method further comprises determining routing of the inbound communication based on a combination of the plurality of control extensions.

7. The method of claim 1, wherein the matching further comprises comparing hashed values of the inbound communication identifier with hashed values of one or more of the sender and recipient identifiers in the predefined list.

8. A communication apparatus, comprising:
   a processor;
   a computer-readable medium, storing computer-executable instructions that, when executed by the processor, cause the apparatus to:
      store a list of hashed sender and recipient address identifier pairs, wherein the list further comprises a pair having a wildcard designator for a user name or domain name; and
      route communications arriving at the apparatus based on a command associated with one of the hashed sender and recipient address identifier pairs in the stored list, wherein the command indicates at least one routing criterion that depends on a time of day, wherein one of the pairs in the list comprises an identification of a trusted third party, and wherein the method further comprises granting the trusted third party access privileges to edit the one of the pairs in the list.

9. The apparatus of claim 8, wherein the stored list of hashed sender and recipient address identifier pairs comprises the command.

10. The apparatus of claim 9, wherein one of the hashed sender and recipient address identifier pairs comprises a plurality of control extensions, and wherein the computer-executable instructions, when executed by the processor, further cause the apparatus to use a combination of the plurality of control extensions in routing incoming communications.

11. The apparatus of claim 8, wherein the command comprises an indication permitting an identified third party to modify in the stored list one of the hashed sender and recipient address identifier pairs associated with the identified third party.

12. The communication apparatus of claim 8, wherein the computer-executable instructions, when executed by the processor, cause the apparatus to store the list before receiving the communications arriving at the apparatus.

13. A communication method comprising:
   receiving at a computing device, from a user, an identification of a sender from whom communications to the user are to be permitted;
   generating a hashed sender and recipient identifier value using address information for the user and the identified sender, wherein the generated hashed sender and recipient identifier value has associated therewith a command that indicates at least one routing criterion that depends on a time of day;
   storing a list of sender and recipient identifiers, wherein the list comprises identifiers having wildcard designators for user names or domain names; and using the hashed identifier value and the command to route incoming communications, wherein one of the identifiers in the list of sender and recipient identifiers comprises an indication of a trusted third party, and wherein the method further comprises granting the trusted third party access privileges to edit the one of the identifiers in the list.

14. The method of claim 13, further comprising:

displaying, on a display device of the computing device, a prior incoming message from the sender; and displaying an option on the display device to automatically generate an identifier value for the sender.

15. The method of claim 13, wherein the receiving further comprises receiving approval from the user to automatically scan an address book of the user.

16. The method of claim 13, further comprising receiving, from the user, an indication to permit the sender to edit the generated hashed sender and recipient identifier value.

\* \* \* \* \*

UNITED STATES PATENT AND TRADEMARK OFFICE
CERTIFICATE OF CORRECTION

PATENT NO. : 8,463,938 B2  
APPLICATION NO. : 12/604823  
DATED : June 11, 2013  
INVENTOR(S) : John O'Reirdan et al.

It is certified that error appears in the above-identified patent and that said Letters Patent is hereby corrected as shown below:

In the Specification

In Column 4, Lines 62-63:
Please delete "<Recipient1@Recipient 1_Domain.com|@Sender_Domain.com>"
and insert -- <Recipient1@Recipient_Domain.com| @Sender_Domain1.com> --

Signed and Sealed this
Fourteenth Day of October, 2014

Michelle K. Lee
*Deputy Director of the United States Patent and Trademark Office*